(12) United States Patent
Iwamoto (10) Patent No.: US 8,525,120 B2
(45) Date of Patent: Sep. 3, 2013

(54) RADIATION MEASURING DEVICE

(75) Inventor: Akinori Iwamoto, Mitaka (JP)

(73) Assignee: Hitachi Aloka Medical, Ltd., Tokyo (JP)

( * ) Notice: Subject to any disclaimer, the term of this patent is extended or adjusted under 35 U.S.C. 154(b) by 817 days.

(21) Appl. No.: 12/452,539

(22) PCT Filed: Aug. 14, 2007

(86) PCT No.: PCT/JP2007/065866
§ 371 (c)(1),
(2), (4) Date: Jan. 7, 2010

(87) PCT Pub. No.: WO2009/022411
PCT Pub. Date: Feb. 19, 2009

(65) Prior Publication Data
US 2010/0108897 A1    May 6, 2010

(51) Int. Cl.
*G01T 1/24* (2006.01)
*G01T 1/20* (2006.01)
(52) U.S. Cl.
USPC .............. 250/367; 250/370.02; 250/486.1
(58) Field of Classification Search
USPC ............................. 250/367, 368, 369, 486.1
See application file for complete search history.

(56) References Cited

U.S. PATENT DOCUMENTS

| | | |
|---|---|---|
| 5,317,158 A | 5/1994 | McElhaney et al. |
| 2006/0151706 A1* | 7/2006 | Minagawa et al. ........... 250/368 |

FOREIGN PATENT DOCUMENTS

| | | |
|---|---|---|
| EP | 1 681 584 A | 7/2006 |
| GB | 801384 A | 9/1958 |
| JP | S62-16486 | 1/1987 |
| JP | H3-231187 | 10/1991 |
| JP | H5-297145 | 11/1993 |
| JP | H7-35869 | 2/1995 |
| JP | H8-248139 | 9/1996 |
| JP | 2000-206254 | 7/2000 |
| JP | 2001-42043 | 2/2001 |
| JP | 2001-141831 | 5/2001 |
| JP | 2003-502647 | 1/2003 |
| JP | 2003-279654 | 10/2003 |
| JP | 2004-149501 | 5/2004 |
| JP | 2005-172511 | 6/2005 |
| JP | 2007-147581 | 6/2007 |
| JP | 2007-218710 | 8/2007 |

\* cited by examiner

*Primary Examiner* — David Porta
*Assistant Examiner* — Yara Green
(74) *Attorney, Agent, or Firm* — DLA Piper LLP (US)

(57) ABSTRACT

A light emitting film is transferred to a light emitting plate serving as a transfer destination member, by a transfer method. The light emitting plate contains a first scintillator material for detecting β ray. The light emitting film includes a protective layer, a light tight layer and a light emitting layer. The light emitting layer contains an adhesive material, and a second scintillator material added thereto for detecting α ray. The light emitting film may be directly formed on a surface of a transparent member, a light receiving surface of a photomultiplier tube or the like by a transfer method. The light tight layer and the light emitting layer are arranged between the protective layer and the transfer destination member, and thus the light tight layer and the light emitting layer are protected physically.

13 Claims, 7 Drawing Sheets

RADIATION MEASURING DEVICE

TECHNICAL FIELD

The present invention relates to a radiation measuring device, and more particularly to a radiation measuring device including a scintillator member.

BACKGROUND ART

Scintillator members are used in various radiation measuring devices including surface contamination measuring instruments, body surface monitors, and so on. When excited by radiation, a scintillator member emits light, which is then directed onto a light receiving surface of a photomultiplier tube (PMT). In order to detect the light generated in the scintillator member with a high degree of sensitivity, a light shielding structure or a light tight structure (a dark room) for shielding the scintillator member from external light is provided on both the front and rear of the scintillator member.

With regard to light shielding on the front surface side of a scintillator member (the surface on which radiation is incident), attenuation of radiation passing through this surface should be considered. In particular, as the ability of $\alpha$ rays and low-energy $\beta$ rays to penetrate a substance is small, a light tight film having a certain thickness would, if provided on the front surface side of a scintillator member, would make blockage and attenuation of the $\alpha$ and $\beta$ rays reaching that surface non-negligible, and therefore considerably lower the measuring sensitivity. Thus, any light tight film provided on the front surface side of a scintillator member must be very thin. However, such thin light tight films have very low physical strength and easily become damaged or corrode. If such a thin film is damaged, scratched or has pinholes formed by scratching, light could enter through opening such as pinholes or scratch marks, making it impossible to detect weak light emission generated in the scintillator member.

In order to overcome the above problems, a technique of providing a plurality of thin light tight films such that they are spaced from each other on a front surface side of a scintillator member may be considered, as described in JP 2001-141831 A and JP 3-231187 A. Each of these light tight films includes a resin film and light tight layers formed on both sides of the resin film. With this structure, even if a light tight layer formed on the top surface of a light tight film provided on the outermost side is damaged, light can be blocked by a light tight layer formed on the rear surface side. Further, even if the entire light tight film provided on the outer side is damaged by a large external force, light shielding can be secured by an adjacent light tight film which is spaced from the damaged light tight film. While a protective grille having a lattice shape may be provided on the front surface side of the outermost light tight film as required, there is a possibility that foreign matter or a contaminant may enter through any of the openings of the lattice. On the other hand, if the area of each opening of the protective grille is reduced to thereby enhance the physical protection, the sensitivity for radiation detection would be decreased.

When a light tight film is mounted on a radiation measuring device, it is necessary to dispose the light tight film while stretching the entire film evenly, so as to prevent wrinkling of the film. This task requires technical skill and takes an immense amount of time and labor. Further, the light tight film can easily tear if excessive force is applied during the placement operation. Conventionally, these problems are very significant because, in general, multiple light tight films are mounted on each radiation measuring device.

JP 7-35869 A discloses one example radiation measuring device in which a scintillator member is used. JP 8-248139 A describes that a light tight film is attached onto a thin light emitting plate having a large area (see paragraph 0041 and so on). Neither reference, however, describes details of the light tight film or a method of attaching the light tight film. In particular, while it is necessary to dispose an extremely thin light tight film in the case of detection of $\alpha$ particles and low-energy $\beta$ particles, no treating method specific to such a thin film is disclosed in any of the references.

JP 62-16486 U describes that a light tight film is provided on a top surface of a plastic scintillator. The light tight film includes a plastic film in a thin film shape and a deposition layer also in a thin film shape which is formed on a rear or top surface of the plastic film. This reference, however, does not describe how the light tight film in a thin film shape is provided on the plastic scintillator. JP 5-297145 A describes that a scintillator layer and a light tight layer are closely attached. However, the light tight layer is removable and is not fixedly adhered to the scintillator layer.

JP 2007-147581 A (and corresponding US2006/0151706A1) discloses a technology of adhering a film which has been removed from a thermal transfer sheet onto a light emitting plate. The film includes a protective layer, a light tight layer, an adhesion layer, and so on. This document, however, does not describe a film for transfer, which is provided with a light emitting function (i.e. a radiation detection function).

DISCLOSURE OF THE INVENTION

The present invention advantageously provides a radiation measuring device having a film provided with a radiation detection function.

The present invention further advantageously provides a radiation measuring device including a scintillator member having a light emitting film, which is capable of measuring both $\alpha$ ray and $\beta$ ray.

Further, the present invention advantageously provides a technology which enables simple formation of a light emitting layer that is resistant to an external force.

(1) Explanation of a Light Emitting Film

A radiation measuring device according to the present invention includes a light emitting film. The light emitting film preferably includes a protective layer which transmits radiation therethrough; a light tight layer which is provided on a rear side of the protective layer, transmits the radiation, and prevents transmission of light; and a light emitting layer which is provided on a rear side of the light tight layer and contains a scintillator material. Here, the light emitting film is preferably a strip film which has been separated from a transfer sheet and transferred onto a transfer destination member. The transfer destination includes a surface of the light emitting plate, a surface of a rear side transparent member, a light receiving surface of a light detector, and so on.

With the above structure, the light emitting film is formed directly on the transfer destination member (i.e. without an air layer being interposed therebetween), using a transfer technology. One or more additional films (e.g. a light tight film or a protective film) are layered on the light emitting film as required. The light emitting film generally includes a protective layer, a light tight layer, and a light emitting layer. The light tight layer is preferably formed as a thin layer containing a metal with high reflectivity, such as aluminum, and transmits radiation entering from outside therethrough and blocks external light from entering. The light tight layer is formed to have a thickness which can minimize attenuation of radiation and which can also exhibit light shielding effects. The protective layer is formed of a material which transmits radiation and simultaneously protects the light tight layer and the light emitting layer from damage. While the protective layer is generally formed as a coated layer by coating or printing and then hardening to have a uniform thickness, the protective layer may be formed by other methods. The protective layer is formed to have a thickness which can minimize attenuation of radiation and can also exhibit a protection effect. it is desirable, however, to determine the thicknesses of the light tight layer and the protective layer in consideration of the number of films to be formed on the scintillator. Alternatively, it is desirable to determine the number of films to be formed on the scintillator in consideration of the thicknesses of the light tight layer and the protective layer in the film. When another film is to be transferred on the light emitting film, the light emitting film which is transferred first may not include the protective film. In such a case, the other film which is transferred after the light emitting film functions as a protective layer. Similarly, the light emitting film which is transferred first may not include a light tight layer. In such a case, the other film which is transferred after the light emitting film includes a light tight layer.

The light emitting layer contains a scintillator material. For example, the light emitting layer is formed of a scintillator material which emits light when α ray enters the scintillator material and an adhesive material having the scintillator material added thereto. A scintillator material which detects β ray may also be used. The adhesive material functions as a member which attaches the light emitting film onto the transfer destination member at the time of transfer of the light emitting film onto the transfer destination member. It is desirable that the protective layer, the light tight layer, and the light emitting layer has a uniform thickness over the entire region. The film may include an intermediate layer which is provided between the protective layer and the light tight layer, another intermediate layer which is provided between the light tight layer and the light emitting layer, and other layers. The light emitting film may be formed directly on a surface of the transfer destination member or on a surface of a transparent coated layer or the like formed on the surface of the transfer destination member.

Because the transfer destination member functions as a rear support member with respect to the light tight layer and the light emitting layer, and also because the light tight layer and the light emitting layer are sandwiched between the protective layer and the transfer destination member, the light tight layer and the light emitting layer are effectively protected against the physical effects. For example, even when an external force is locally applied onto the light emitting film, the force is dispersed in the protective layer and also in the transfer destination member, so that the local stress which would otherwise be applied onto the light tight layer and light emitting layer can be prevented or reduced. Further, because the transfer destination member also functions as a rear support member with respect to the protective layer itself, the strength of the protective layer can be enhanced.

The use of an adhesion technology can eliminate any need for use of a unique or complicate device for attaching the light emitting film, which allows simple formation of films. For forming the light emitting film, it is desirable to use the transfer technology. In this case, because it is necessary only to transfer a strip film including an aluminum deposition layer and a radiation detection layer which has been already formed onto the transfer destination member, the need to process the transfer destination member at a high temperature for a long period can be eliminated. In addition, because the films which have been already formed to have a uniform thickness can be used as they are, the problem of uneven thickness can also be avoided. Although heat conduction to the transfer destination member does occur when a thermal transfer method is adopted, even in such a case, processing can be performed at a relatively low temperature and also it is sufficient to heat only the thermal transfer portion for a short time period, as a result of which influences caused by heating can be substantially disregarded. Further, the use of a pressure sensitive transfer method can completely eliminate potential problems resulting from heating. It is obvious that a transfer method in which light such as ultraviolet light is used can also be adopted.

Preferably, the transfer sheet is a thermal transfer sheet, and the light emitting film is formed by a heat transfer technology. Preferably, the transfer sheet is a pressure sensitive sheet, and the light emitting film is formed by a pressure sensitive transfer technology. By using the transfer method as described above, it is possible to separate a light emitting film, which has been previously formed as a thin film on a base film having a certain degree of thickness, from the base film and attach the light emitting film onto the transfer destination member in a simple manner. As such, prior to the transfer, the light emitting film is integrated with the base film and is therefore in a stout state, and after the transfer, the light emitting film is then integrated with the transfer destination member and is also in a stout state. Further, because the light tight layer (along with the light emitting layer) can be formed using a simple method of transfer, workability can be drastically increased compared to the conventional manual disposing method. Also, at the time of manufacturing the transfer sheet, the protective layer having a uniform thickness can be formed by coating of a predetermined material onto the base film, and control of the thickness of such a protective film can be facilitated. It is also easy to form the light tight layer by vapor deposition so as to have a uniform thickness on a rear surface of the protective layer which has been coated and hardened.

Preferably, the light tight layer is a deposition layer containing a metal having high reflectivity such as aluminum. Preferably, the protective layer is a colored layer having a light shielding effect. Because the protective layer, which is a colored layer, has a light shielding effect by itself, the light shielding performance of the film as a whole can be further increased. Preferably, one or a plurality of films are layered on the surface of the light emitting film, and each of the additional films preferably includes a protective layer, a light tight layer, and an adhesive layer. Preferably, the radiation to be detected in the light emitting layer is α or β ray. While the above light emitting film can similarly be employed in the detection of X rays and γ radiation, the film is particularly efficient for detection of α particles and low-energy β particles, which tend to attenuate very easily, even in air. Preferably, a transparent reinforcing member is provided on a rear side of the transfer destination member. In the case of detecting only one of α ray and β ray, in which case detection can be performed by the light emitting layer, the transfer destination member can be simply formed of a reinforcing member without having the radiation detection function.

(2) Explanation of a Radiation Measuring Device

Preferably, a radiation measuring device includes a light emitting film, and a light detection unit which detects light emitted from a rear side of the light emitting film, and the light emitting film includes a protective layer which transmits radiation therethrough; a light tight layer which is provided on a rear side of the protective layer, transmits the radiation, and prevents transmission of light; and a light emitting layer which is provided on a rear side of the light tight layer and contains a scintillator material which emits light when radiation enters the scintillator material, and the light emitting film is a strip film which has been separated from a transfer sheet.

With the above structure, the light emitting film which has been separated from the transfer sheet is transferred onto a surface of the transfer destination member. The light emitting film, which includes a light emitting layer, is capable of detecting radiation as light by the light emitting layer formed therein. The light tight layer is provided on the top side of the light emitting layer, and exerts an effect of preventing the external light from entering and, more preferably, an effect of reflecting the internal light toward the inside. The light tight layer and the light emitting layer can be sandwiched between the protective layer and the transfer destination member for physical reinforcement. The use of the transfer method can eliminate complicated operations which are required in the conventional art.

Preferably, the transfer sheet is a thermal transfer sheet and the light emitting film is formed by a thermal transfer method. Preferably, one or a plurality of films having a light shielding effect are layered on a top side of the light emitting film by a thermal transfer method. These films may have the same structure or different structures. Preferably, the light emitting layer includes an adhesive material having the scintillator material added thereto. Preferably, the light emitting film is provided on an upper side of a transparent rear plate. The rear plate is a transfer destination member and may be a light emitting plate, a transparent reinforcing member, and so on, for example. Preferably, the light emitting film is provided on a light receiving surface of the light detection unit.

Preferably, the radiation measuring device includes a light emitting plate including a first scintillator material which is transparent, a light emitting film provided on a top side of the light emitting plate, and a light detection unit which detects light generated in the light emitting plate and also detects light generated in the light emitting film, and the light emitting film includes a protective film which transmits radiation therethrough, a light tight layer which is provided on a rear side of the protective layer and which transmits radiation therethrough and prevents transmission of light, and a light emitting layer which is provided on a rear side of the light tight layer and contains a second scintillator material which emits light when radiation enters the second scintillator material, and the light emitting film is a strip film which has been transferred from the transfer sheet onto a surface of the light emitting plate. With this structure, the radiation measuring device can exert both the radiation detection effect by means of the first scintillator material and the radiation detection effect by means of the second scintillator material.

Preferably, the first scintillator material is a scintillator material for β ray detection, and the second scintillator material is a scintillator material for α ray detection. With this structure, a radiation measuring device for measuring both α and β rays can be configured. Preferably, the light emitting layer has an adhesive material in which the second scintillator material is dispersed. Here, a separate, transparent adhesive layer may be formed independently of the light emitting layer.

BRIEF DESCRIPTION OF THE DRAWINGS

These and other objects of the invention will be explained in the description below, in connection with the accompanying drawings, in which.

BEST MODE FOR CARRYING OUT THE INVENTION

Preferred embodiments of the present invention will be described with reference to the drawings.

Figure 1:
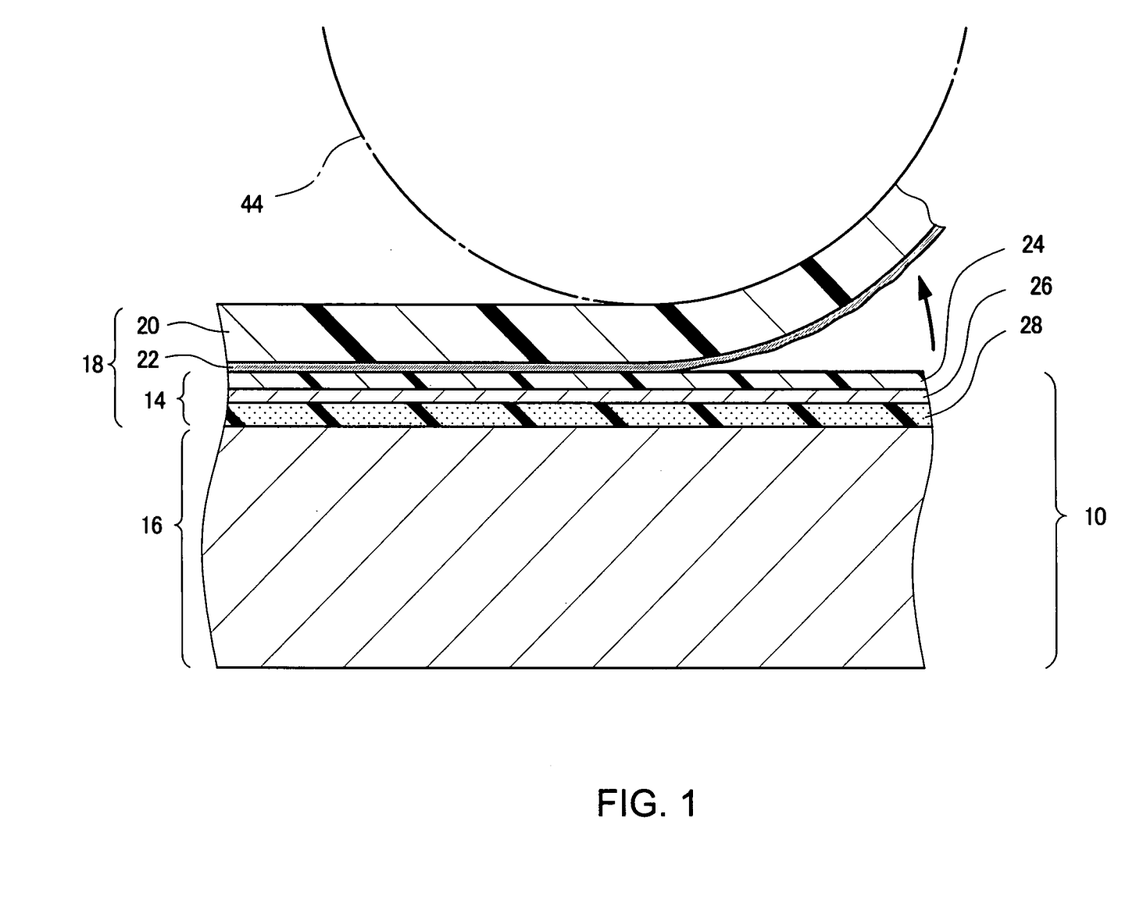
FIG. 1 is a conceptual view illustrating a method of manufacturing a scintillator member according to the present invention.

FIG. 1 illustrates a manufacturing method of a scintillator member (scintillator assembly or scintillator construction) 10 according to an embodiment of the present invention. The scintillator member 10 is used as a radiation detector in a radiation measuring device. The scintillator member 10 is composed of a light emitting plate 16 and a light emitting film 14. While a scintillator member including only the light emitting film formed on a surface (a radiation entering surface) of the light emitting plate 16 is illustrated in FIG. 1, one or a plurality of additional films may be layered on the surface of the light emitting plate 16 in addition to the light emitting film 14.

The light emitting plate 16 is formed of a plastic scintillator material (a first scintillator material). In the present embodiment, the light emitting plate 16 is used for β ray detection, and detection of α ray is performed by the light emitting film 14, as will be described in detail below. The light emitting plate 16, when excited by β radiation, emits light, and the emitted light is then detected on a rear side of the light emitting plate 16. The scintillator member 10 is illustrated as a plate member in FIG. 1, and the scintillator member 10 forms a so-called "large-area" or "small-area" scintillator detector. However, the shape of the scintillator member 10 is not limited to a flat plate, and may also be a curved plate or a cylinder, for example. Through use of transfer technology, a light emitting film 14 can easily be formed on a member having any shape.

The light emitting film 14 is provided with both a function of emitting light when excited by α radiation and a function of blocking the external light. According to the present embodiment, the light emitting film 14 is a strip film which has been separated from a thermal transfer sheet 18, as will be described in detail below. The light emitting film 14, as viewed from the radiation entering side, includes a protective layer 24, a light tight layer 26, and a light emitting layer 28 in this order. Each of these layers has a uniform thickness over the entire region.

The protective layer 24 is formed of a transparent material or colored material, and covers the entire surface of the light tight layer 26 to provide a function of protecting the light tight layer 26 or the like against physical damage. The protective layer 24 may be formed by an acryl epoxy material, for example, and has a thickness which is set within the range between 0.5 and 3 μm. Preferably, the protective layer 24 has a thickness of 1.0 μm. A rigid material is used to form the protective layer 24 into a uniform thin layer, to thus protect the light tight layer 26 and the light emitting layer 28 against physical damage, as noted above. The protective layer 24, when formed as a colored layer, such as a black or white layer, for example, can itself provide a light shielding function. Because resin materials generally have less of an influence on the attenuation of radiation than the aluminum material which forms the light tight layer 26, it is desirable to form the protective layer 24 to have a greater thickness than the light tight layer 26. As long as sufficient radiation detection sensitivity can be ensured, the protective layer 24 may be formed by adding an additive (e.g. silica, aluminum oxide) to a base material (resin materials), thereby enhancing the strength of the protective layer 24.

The protective layer 24 is a coated (or applied) film formed by coating and hardening a predetermined material on a base film, which will be described below. Although such a coating process is advantageous in that a uniform thin film can be formed comparatively easily, it is obvious that the protective layer can be formed using other methods.

In the present embodiment, prior to the thermal transfer, the light emitting film 14 is integrated with the base film 20, which will be described below, to thereby secure the strength of the light emitting film 14, and after the thermal transfer, the light emitting film 14 is then integrated with the light emitting plate 16 serving as a transfer destination member, to thereby secure the strength of the light emitting film 14. As such, as it is not necessary to have the light emitting film 14 (particularly, the light tight layer 26 and the light emitting layer 28) exist alone or independently, handling of the light emitting film 14 is very easy.

The light tight layer 26 is formed of an aluminum material or a mixed material including an aluminum material, and is formed, as a deposit layer, on the rear surface of the protective layer 24. Specifically, the light tight layer 26 is formed by deposition during formation of the heat transfer sheet 18, and has a thickness which is set within a range between 0.01 and 1.5 µm, preferably 0.04 µm. The light tight layer 26 may alternatively be formed during formation of the thermal transfer sheet 18 by any method other than the deposition method. The light tight layer 26 is provided with a light shielding function for transmitting radiation, which is the target of measurement, while simultaneously preventing external light from reaching the light emitting plate and a reflection function for reflecting light entering from the light emitting plate side. Here, it is also possible to form the deposition layer using a material other than an aluminum material.

In the present embodiment, the light emitting layer 28 is formed of an adhesive material and a second scintillator material in a powder form, which is dispersedly added to the adhesive material. The second scintillator material may be a powdery ZnS(Ag), for example, and the addition ratio of the second scintillator material may be 50% or more, for example, and preferably, 80% or more. The addition ratio may, however, be less than 50%, as long as sufficient detection sensitivity can be ensured. If the particle size of all the particles forming the powder is small, it is possible to ensure uniform dispersion of the second scintillator material over the entire light emitting layer 28 while simultaneously facilitating reduction of the thickness of the light emitting layer 28. For example, the particles may have a diameter of 1 µm or less. In the present embodiment, the second scintillator material emits light when irradiated with α ray. Other scintillator materials having such an effect may also be used. A scintillator member for β ray detection may also be used. The adhesive material is a thermoplastic adhesive material, for example, and is an olefin material (e.g. a PP adhesive material, an acrylic adhesive material, and so on). The adhesive material serves to attach the light emitting film 14 onto the light emitting plate 16. The light emitting layer 28 has a thickness of approximately 2 to 3 µm, for example. While it is desirable to use a material which is hardened by heating as the adhesive material, various other adhesive materials can be used. However, because attenuation of β ray cannot be disregarded if the light emitting layer 28 is too thick, it is desirable to determine the thickness and composition of the light emitting layer 28 in consideration of the possibility of attenuation of β ray and to ensure that the light emitting layer 28 can detect α ray and emit the light thereof towards the rear surface. Further, the light emitting layer containing the second scintillator material and the adhesive layer formed on the rear side of the light emitting layer, having respective light emitting and adhesive functions, may be provided separately. It is desirable that the adhesive material is formed of a transparent material in order to prevent excess attenuation of light.

The light emitting plate 16 has a thickness of 0.5 to 2.0 mm, for example, and the thickness is appropriately set in consideration of the β radiation or the like as the target of detection. For example, it is possible to form the scintillator member 10 by a thin light emitting plate 16 and a light emitting film 14 and curve the scintillator member for use as a radiation detector. The light emitting film 14 may be formed by thermal transfer in a state where the light emitting plate 16 is curved. While the light emitting plate 16 is normally transparent by itself, extremely fine uneven portions which cause light scattering may be formed on a surface of the light emitting plate 16, as required, so as to increase the light emission portion as viewed from the light detector side. A transparent reinforcing member which does not have a radiation detection function may be used in place of the light emitting plate 16. In this case, only the light emitting layer 28 functions as an α ray detector (or a β ray detector).

The transfer sheet 18 will be described in detail. The transfer sheet 18 includes a base film 20 and the above-described light emitting film 14, with a release layer 22 being interposed between the base film 20 and the light emitting film 14. During the thermal transfer, when the transfer sheet 18 is heated, the light emitting film 14 will be separated from the base film 20 due to the effect of the release layer 22. Simultaneously, the light emitting film 14 is adhered onto the light emitting plate 16 due to the effect of the adhesive material described above. The base film 20 is formed of a polyester resin, for example, and is more specifically formed of a polyethylene terephthalate (PET) film. The thickness of the base film 20 is set within a range between 10 to 20 µm, preferably to 16 µm. The release layer 22 is formed of a wax or acryl material, and has a thickness which is set within a range between 0.3 to 0.8 µm, and preferably to 0.5 µm. A thermal transfer sheet including no such release layer can also be used.

FIG. 1 illustrates a state wherein the thermal transfer sheet 18 is superimposed on the light emitting plate 16 and the resulting composite member is being transported. After the composite member is locally heated using a thermal transfer roller which is not shown, a guide roller 44 rolls up the base film 20. Consequently, the light emitting film 14 is separated from the base film 20 as described above and remains on the light emitting plate 16 side, and the thermal transfer process is thus completed.

As will be described below, as heat conduction to the light emitting plate 16 is performed locally during the thermal transfer process, a problem of deterioration of the light emitting plate 16 formed of the first scintillator material (and the second scintillator material) due to the thermal effects occurs rarely. However, in order to prevent curving of the scintillator member 10 after the thermal transfer, a thin flat metal plate may be provided on the rear side of the light emitting plate 16 (i.e. between the light emitting plate 16 and a belt conveyer which will be described below). Such a metal plate is formed of aluminum, for example, and exerts a heat absorption effect for removing the heat applied to the light emitting plate 16 from the rear surface of the light emitting plate 16.

It should be noted that the numerical values described above are provided only as examples, and various values can be adopted in consideration of various conditions. For example, it is possible to minimize the thickness of the light tight layer 26 as long as the light shielding function thereof is sufficiently secured and to simultaneously increase the thickness of the protective layer 24. Further, it is also possible to form a film by a thin light tight layer 26 and a thin protective layer 24 and layer a plurality of such films, thereby forming a thick light tight layer and a thick protective layer as a single unit. It is always desirable to appropriately set the thickness of each material so as to enable detection of α and β rays with a sufficient sensitivity and also to sufficiently secure the physical protection of the light tight layer or the like.

Figure 2:
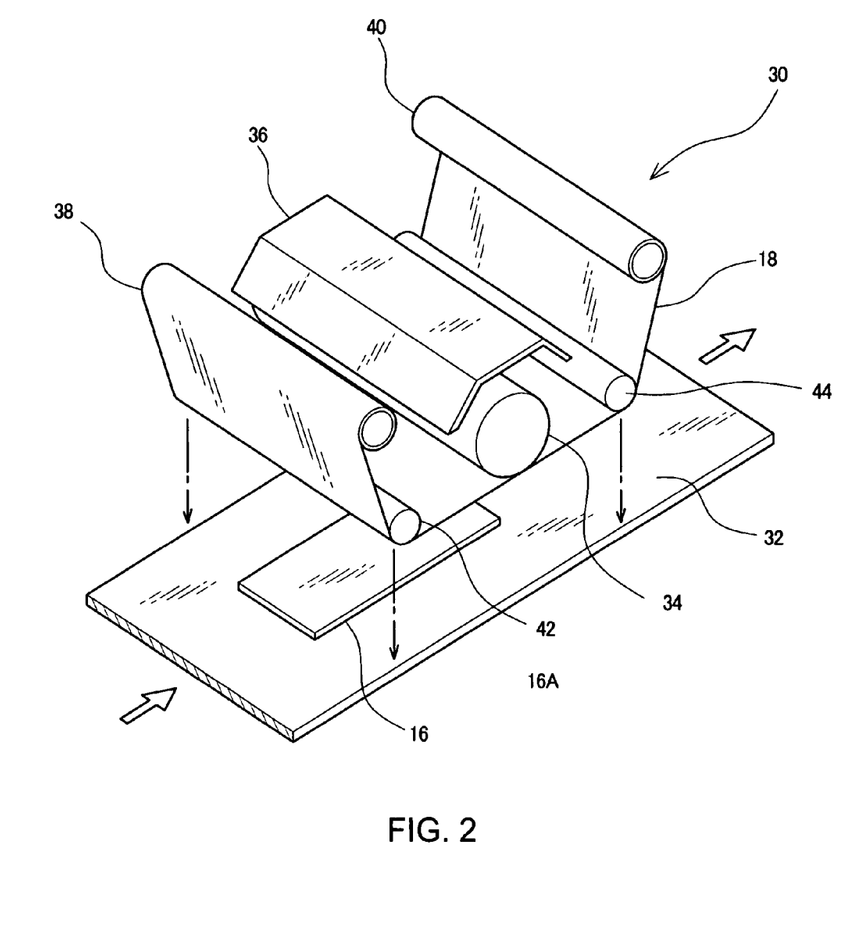
FIG. 2 is a perspective view illustrating a structure of a thermal transfer device.

FIG. 2 illustrates a general thermal transfer device 30. The light emitting plate 16 is placed on a conveyer. belt 32 and is transported with the movement of the conveyer belt 32 in the direction shown in the arrow in FIG. 2. A transfer unit, which includes a feed roller 38, a take-up roller 40, a heater 36, a thermal transfer roller 34, and guide rollers 42 and 44, and so on, is provided above the conveyer belt 32.

A thermal transfer sheet is wrapped around the feed roller 38. The thermal transfer sheet 18 which is supplied from the feed roller 38, guided by the guide roller 42, passes the thermal transfer roller 34, is turned by the guide roller 44, and is then taken up by the take-up roller 40. The thermal transfer roller 34 is heated to a predetermined temperature by the heater 36, and presses the thermal transfer sheet 18 onto the light emitting plate 16 passing under the thermal transfer roller 34. As such, heat and pressure are simultaneously applied onto the light emitting plate 16 at a an area where it contacts the thermal transfer roller 34. The conveyer belt 32 and the thermal transfer sheet 18 are moving at a same, fixed speed. Separation of the base film 20 and the light emitting film 14 in the thermal transfer sheet 18 is accomplished as the thermal transfer sheet 18 which has been heated is turned by the guide roller 44, due to the effect of the guide roller 44 as shown in FIG. 1. In other words, the light emitting film 14 is stripped off the base film 20.

Accordingly, through use of the thermal transfer device 30 as shown in FIG. 2, film formation processing can be performed easily and rapidly with respect to light emitting plates 16 (or transfer destination members) of various shapes and sizes, thereby allowing significant reduction in the manufacturing costs. This structure also provides an advantage that the film formation processing can be performed in various locations. By aligning a plurality of light emitting plates 16 on the conveyer belt 32, the thermal transfer processing can be performed successively with respect to these light emitting plates 16. Therefore, the structure shown in FIG. 2 is also advantageous in that it simplifies and facilitates mass production. While the heating temperature at the time of thermal transfer in this example is 100 to 250° C., for example, the heating temperature may be appropriately set in accordance with the thermal transfer sheet and the scintillator material and the like. As the portion to which heat is applied is limited in both the transporting direction and the depth direction of the light emitting plate and also heating is performed only instantaneously, the thermal influence on the scintillator material can be substantially disregarded. A small size transportable transfer device may also be used in accordance with the size and shape of the transfer destination member. The transfer destination member is not limited to a plate formed of a scintillator material described above, and may be a transparent member having a planar shape or an arbitrary shape, a transmission block forming a light guide, a light receiving surface of a photomultiplier tube, and so on. The light emitting film 14 according to the present embodiment can be provided in a radiation measuring device for detecting both α and β rays, and also is applicable to a radiation measuring device for detecting only α particles, a radiation measuring device for detecting only β particles, and other radiation measuring devices.

Figure 3:
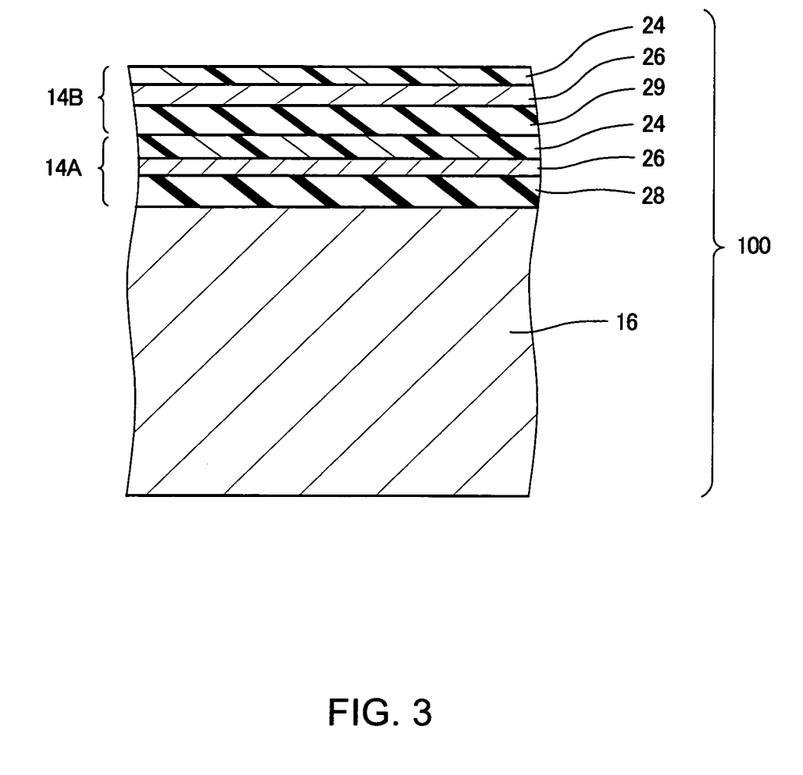
FIG. 3 is a view illustrating a scintillator member having a plurality of films.

FIG. 3 illustrates a scintillator member 100 in which a plurality of films are layered. Referring to FIG. 3, a light emitting film 14A and a light tight film 14B are provided on the light emitting plate 16. The film 14A includes, as viewed from the radiation entering side, a protective layer 24, a light tight layer 26, and a light emitting layer (an adhesive layer) 28. The film 14B includes, as viewed from the radiation entering side, a protective layer 24, a light tight layer 26, and an adhesive layer 29. By repeating the process as described with respect to FIG. 2 twice, the two-layer structure including films 14A and 14B as illustrated in FIG. 3 can be formed easily. Obviously, it is similarly easy to form a layered structure including three or more films.

In the thermal transfer process illustrated in FIG. 2, it is desirable the surface of the light emitting plate 16 serving as a transfer destination member be made sufficiently free of foreign matter such as dust and waste, prior to the thermal transfer processing. Namely, it is desirable to clean the surface of the light emitting plate 16. In this case, cleaning methods such as air blowing or washing can be used. In some cases, it is also possible to prepare a clean space or an equivalent room and perform the thermal transfer processing in such a space, in order to prevent contaminants from entering. Clean air which has passed through an air filter is introduced into such a sealed space. An air blower is a device which sprays clean air onto the light emitting plate 16 to blow foreign matter off the surface prior to the thermal transfer. This processing has an advantage that generation of pin holes caused by foreign matter can be effectively prevented.

In addition to the thermal transfer method described above, it is also possible to adopt a pressure sensitive transfer method. With such a method, a pressure sensitive sheet is used. The pressure sensitive sheet, similar to the thermal transfer sheet described above, includes a film (having a protective layer, a light tight layer, and a light emitting layer) on a base sheet. In this case, as the adhesive material included in the light emitting layer in the pressure sensitive sheet, an adhesive material which sufficiently exerts an adhesion effect when pressure is applied is used, rather than a thermoplastic adhesive material. In the pressure sensitive transfer method, the pressure sensitive transfer sheet is pressed onto a transfer destination plate by a pressure roller, and thus the light emitting film (a release film) is transferred onto the light emitting plate. This pressure transfer method can provide advantages similar to those of the thermal transfer method. More specifically, because the light emitting film is formed on the base film prior to the transfer, it is possible to form the light emitting film to have a small thickness. In addition, physical or structural protection and reinforcement of the light emitting film can be achieved to a greater degree than when the light emitting film exists solely. After the transfer, as the light emitting film is transferred to the transfer destination plate, the light emitting film can be protected and reinforced physically or structurally. Generation of thermal distortion can be prevented by using the pressure transfer method, whereas transfer of a thinner film can be achieved by using the thermal transfer method. Here, it is also possible to transfer the light emitting layer as a film onto the transfer destination member and thereafter retransfer the light tight layer as a film.

Figure 4:
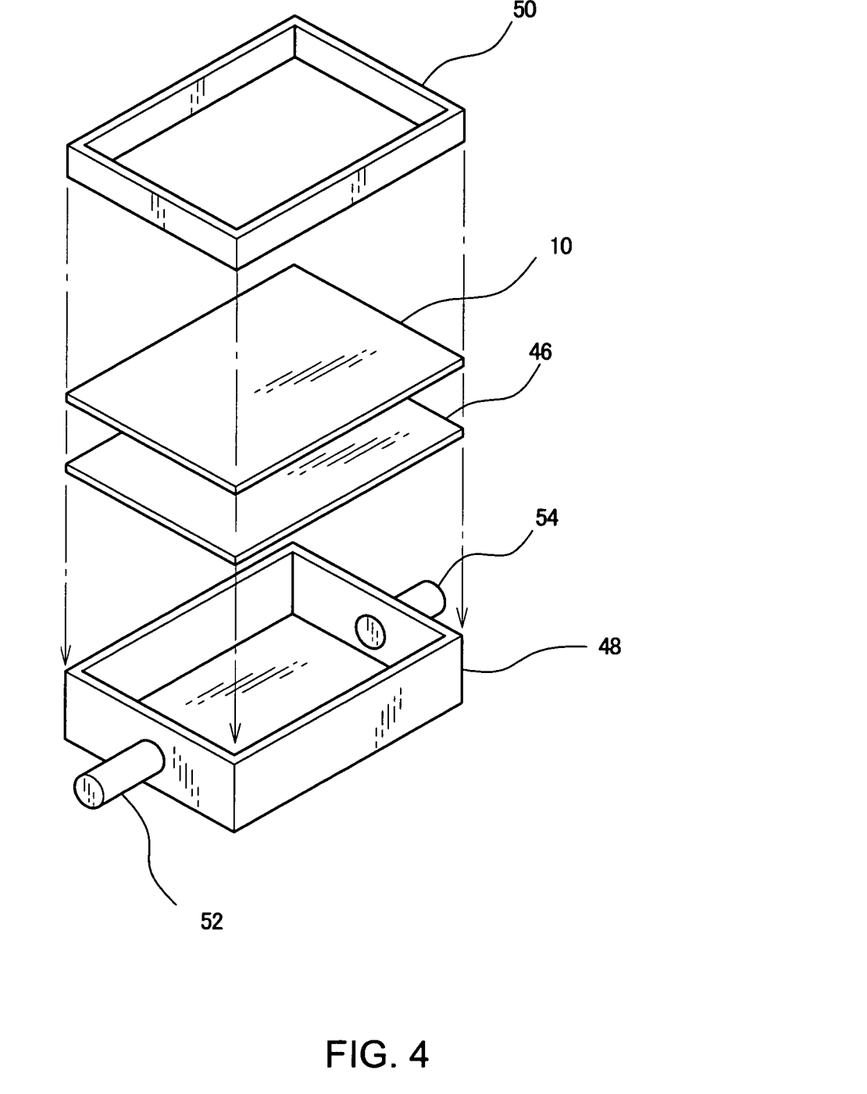
FIG. 4 is a conceptual view of a radiation measuring device for measuring both α ray and β ray.

FIG. 4 is an exploded perspective view which conceptually illustrates a device for measuring both α and β ray, having the scintillator member 10 described above. A transparent reinforcing plate 46 which is formed of an acryl plate or the like is provided on the rear side of the scintillator member 10, and these members are mounted in a container 48. The reinforcing plate 46 is provided as required. Specifically, a frame body 50 holds and secures these members with respect to the container 48. The container 48 forms a so-called dark room, and, in the example illustrated in FIG. 4, light receiving surfaces of two photomultiplier tubes (PMTs) 52 and 54 are exposed in the interior space of the container 48.

β ray entering from outside passes through the light emitting film in the scintillator member 10 and reach the light emitting plate, from which light is emitted. The emitted light then passes through the transparent reinforcing plate 46 and reaches the interior space of the container 48, where the light is detected by the two photomultiplier tubes 52 and 54. α ray entering from outside reaches the light emitting layer of the light emitting film, where the scintillator material included in the light emitting layer emits light. The emitted light then passes through the transparent light emitting plate and reaches the interior space of the container 48, where the light is detected by the two photomultiplier tubes 52 and 54. Separate detection signals for β particles and α particles can be provided by employing waveform discrimination processing, so that the respective signals are counted independently. The scintillator member 10 includes a light emitting film which is protected physically, and, due to the light shielding effect achieved by the light tight layer included in this light emitting film, entering of external light can be effectively prevented. In particular, even when any member comes into contact with the surface of the scintillator member 10 through an opening portion of the frame body 50, the light tight layer and the light emitting layer can be protected by the protective layer described above. Specifically, the light tight layer and the light emitting layer are sandwiched between the protective layer and the light emitting plate, and also the light emitting plate functions as a rear support substrate with respect to the protective layer (and also with respect to the light tight layer). Accordingly, even when a local stress is applied onto the protective layer, such a stress can be dispersed by the rear support substrate, as a result of which physical strength of the light emitting film can be enhanced. The light tight layer also reflects a portion of the light emitted from the light emitting layer and the light emitting plate back into these members, thereby enhancing detection sensitivity.

Figure 5:
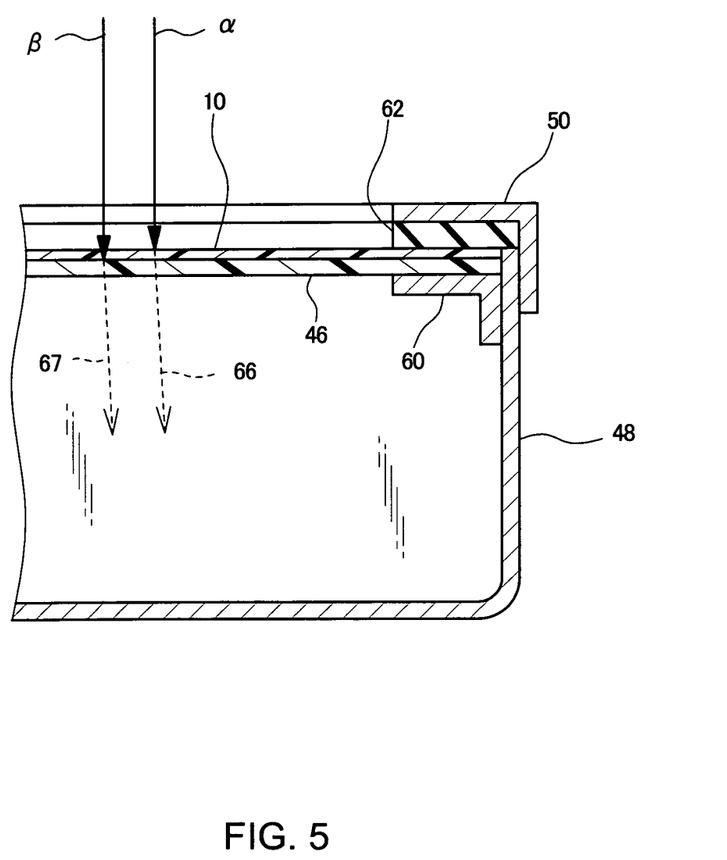
FIG. 5 is a partial cross sectional view of a radiation measuring device illustrated in FIG. 4.

FIG. 5 illustrates a partial cross sectional view of the radiation measuring device illustrated in FIG. 4. The composite member formed by the scintillator member 10 and the reinforcing plate 46 is supported by a frame 60 attached on the container 48. By pressing the composite member against the frame 60 via a packing 62 by the frame body 50, a gap is completely closed by the effect of the packing 62, thereby effectively preventing external light from entering through the gap. The packing 62 has an annular shape for surrounding the entire periphery of the composite member. Due to the effect of penetrating β ray, light is emitted in the light emitting plate of the scintillator member 10, as indicated by numerical reference 67. Similarly, due to the effect of penetrating α ray, light is emitted in the light emitting layer of the scintillator member 10, as indicated by numerical reference 66. As described above, the light tight layer of the scintillator member exerts an effect of blocking external light and reflecting and returning the inner light. As will be described below, it is possible to employ only the light emitting film to thereby form an α ray radiation detector.

Figure 6:
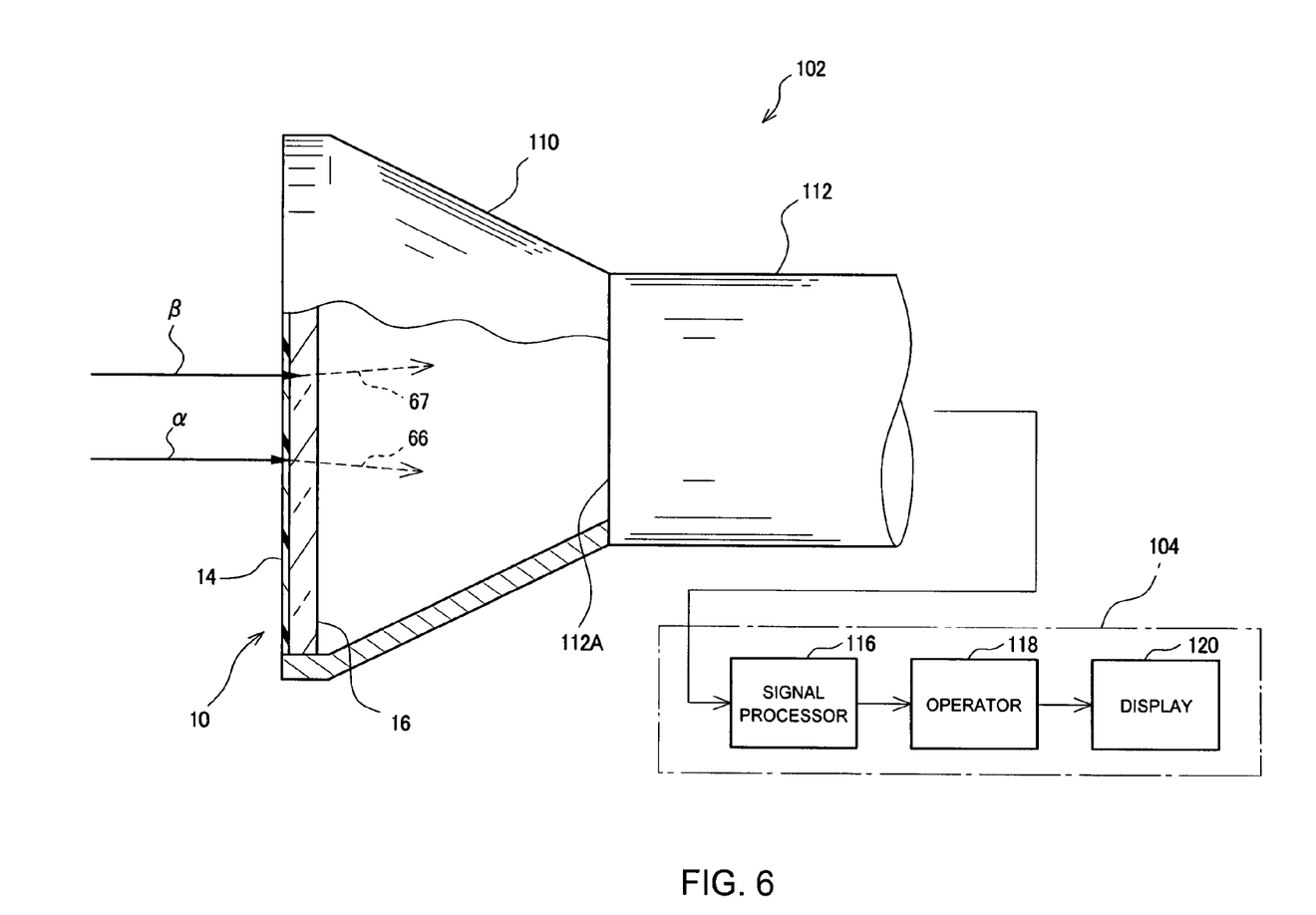
FIG. 6 is a conceptual view illustrating another radiation measuring device for measuring both α ray and β ray.

FIG. 6 illustrates a radiation measuring device according to another embodiment of the present invention. This radiation measuring device is composed of a detection unit 102 and an operation unit 104. The detection unit 102 includes a photomultiplier tube 112 which detects light, a light guide 110 provided so as to surround a light receiving surface 112A of the photomultiplier tube 112, and a scintillator member 10 provided on a front surface opening of the light guide 110. The light guide 110 is formed as a hollow member or a packed member, and coating processing using a reflective material such as titanium oxide or mirror finishing is applied to the inner surface of the light guide 110.

The scintillator member 10 includes a light emitting plate 16 and a light emitting film 14 formed on the radiation entering side of the light emitting plate 16 by thermal transfer. The light emitting film 14 includes, when observed from the radiation entering side, a protective layer, a light tight layer, and a light emitting layer, as described above.

On the other hand, the operation unit 104 includes a signal processor 116, an operator 118, and a display 120. The signal processor 116 has, in addition to an effect of amplifying a signal from the multiplier tube, an effect of executing waveform discrimination with respect to the signal to extract an α ray detection signal and a β ray detection signal. The operator 118 counts the α ray detection signal and s the β ray detection signal. Based on the count results thus obtained, a predetermined radiation measuring value, such as the emission ratio, is calculated for each of α ray and β ray. The calculated value is then displayed on the display 120. The structure of the operation unit 104 itself is well known.

In the present embodiment, with the use of the scintillator member 10 described above, simultaneous measurement of α ray and β ray can be achieved. It is obvious that, if a transparent acrylic plate or the like is used in place of the light emitting plate 16, a radiation measuring device for detecting α radiation can be easily formed.

Figure 7:
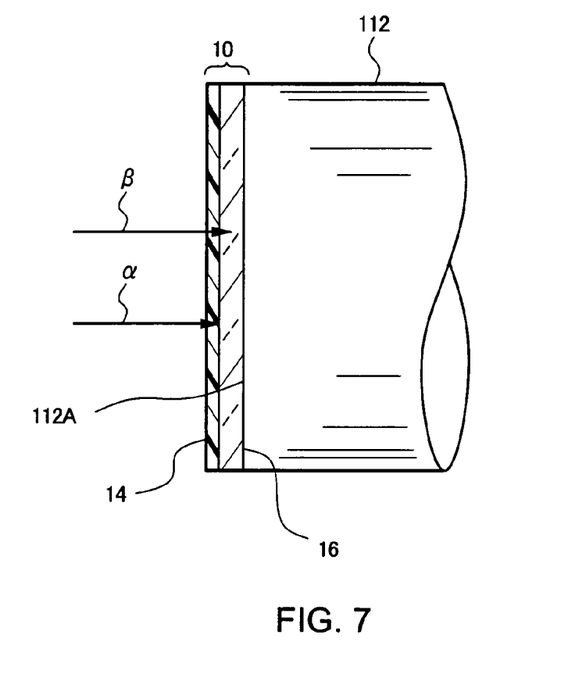
FIG. 7 is a view illustrating a radiation measuring device in which a scintillator member is directly disposed on a light receiving surface of a photomultiplier tube.
Figure 8:
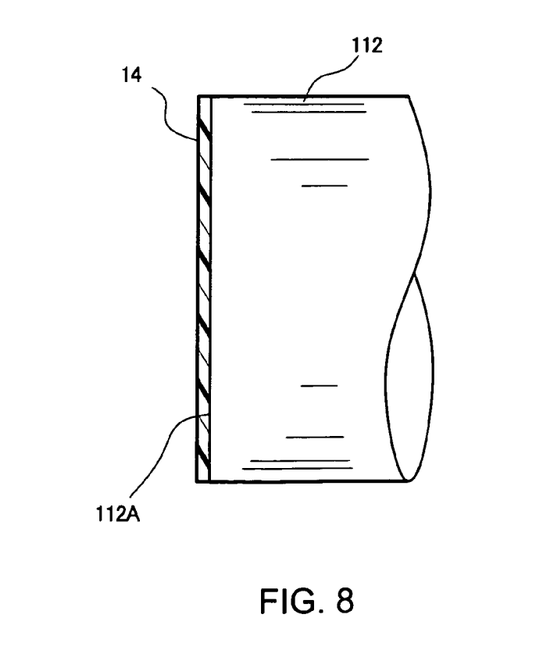
FIG. 8 is a view illustrating a radiation measuring device having a light emitting film directly transferred onto a light receiving surface of a photomultiplier tube.

FIGS. 7 and 8 illustrate further embodiments of the present invention. In the embodiment illustrated in FIG. 7, the scintillator member 10 is attached onto the light receiving surface 112A of the photomultiplier tube 12. The scintillator member 10 is formed of the light emitting film 14 and the light emitting plate 16. Simultaneous detection of both α and β rays can be achieved similarly with this structure. In the embodiment illustrated in FIG. 8, the light emitting film 14 is directly formed on the light receiving surface 112A of the photomultiplier tube 112. In this case, as described above, a transfer method, particularly a thermal transfer method is used to press and rotate the heating roller in a state in which a thermal transfer sheet is superimposed on the light receiving surface 112A, so that the light emitting film 14 can be formed easily on the light receiving surface 112A. It is also possible to form, as desired, one or more films (light tight films) on the light emitting film 14 by using a transfer method, thereby further enhancing the light shielding property as well as the physical reinforcement. However, when forming a plurality of films, it is desirable to appropriately determine the whole thickness in accordance with the type and energy of the radiation and so on. More specifically, it is desirable to form the detection unit with maximum light shielding effects and the maximum fastness properties, within a range in which excessive attenuation of the radiation can be prevented.

The invention claimed is:

1. A method of manufacturing a radiation measuring device which includes a rear member including a scintillator material for detecting β ray, a light emitting film provided on an upper side of the rear member, and a light detection unit which detects light emitted from a rear side of the light emitting film, the method comprising a transfer step of transferring the light emitting film from a transfer sheet including the light emitting film to the upper side of the rear member, in which it is not necessary to have the light emitting film exist alone, wherein the light emitting film includes:

a protective layer through which α ray and β ray are transmitted;

a light tight layer which is provided on a rear side of the protective layer, transmits α ray and β ray, and prevents transmission of light; and a light emitting layer having a thickness of approximately 2-3 μm which is provided on a rear side of the light tight layer and includes a scintillator material having a particle diameter of 1 μm or less for detecting α ray, which emits light when the α ray enters the scintillator material, and in the transfer step, the light emitting film serving as a transfer film is adhered to an upper side of the rear member and is simultaneously separated from the transfer sheet.

2. The method according to claim 1, wherein the transfer sheet is a thermal transfer sheet, and the light emitting film is formed by a thermal transfer method.

3. The method according to claim 1, wherein one or a plurality of films having a light shielding property are layered on a top side of the light emitting film by a thermal transfer method.

4. The method according to claim 1, wherein the light emitting layer includes an adhesive material to which the scintillator material for detecting α ray is added.

5. A method of manufacturing a scintillator member, comprising:

with the use of a transfer sheet including a light emitting film serving as a removable transfer film, transferring the light emitting film from the transfer sheet onto an upper side of a scintillator plate for detecting β ray, in which it is not necessary to have the light emitting film exist alone, wherein the light emitting film includes a protective layer through which α ray and β ray is transmitted;

a light tight layer which is provided on a rear side of the protective layer, transmits α ray and β ray, and prevents transmission of light; and a light emitting layer having a thickness of approximately 2-3 μm which is provided on a rear side of the light tight layer and includes a scintillator material having a particle diameter of 1 μm or less for detecting α ray, which emits light when the α ray enters the scintillator material, and during the transfer of the light emitting film, separation of the light emitting film from the transfer sheet is performed simultaneously with adhesion of the light emitting film onto the upper side of the scintillator plate for detecting β ray.

6. A radiation measuring device, comprising:

a rear member including a scintillator material for detecting β ray;

a light emitting film provided on an upper side of the rear surface member; and a light detection unit which detects light emitted from a rear side of the light emitting film, wherein the light emitting film includes:

a protective layer through which α ray and β ray are transmitted; a light tight layer which is provided on a rear side of the protective layer, transmits α ray and β ray, and prevents transmission of light; and a light emitting layer having a thickness of approximately 2-3 μm which is provided on a rear side of the light tight layer and includes a scintillator material having a particle diameter of 1 μm or less for detecting α ray, which emits light when α ray enters the scintillator material, and the light emitting film is separated from a transfer sheet and is simultaneously adhered to an upper side of the rear member.

7. The radiation measuring device according to claim 6, wherein the transfer sheet is a thermal transfer sheet, and the light emitting film is formed by a thermal transfer method.

8. The radiation measuring device according to claim 6, wherein one or a plurality of films having a light shielding property are layered on a top side of the light emitting film by a thermal transfer method.

9. The radiation measuring device according to claim 6, wherein the light emitting layer includes an adhesive material to which the scintillator material for detecting α ray is added.

10. A radiation measuring device, comprising:

a light emitting film which is provided on an upper side of a rear member;

a light detection unit which detects light emitted from a rear side of the light emitting film, the light emitting film including:

a protective layer through which α ray therethrough is transmitted;

a light tight layer which is provided on a rear side of the protective layer, transmits α ray, and prevents transmission of light; and a light emitting layer having a thickness of approximately 2-3 μm which is provided on a rear side of the light tight layer and includes a scintillator material having a particle diameter of 1 μm or less for detecting α ray, which emits light when α ray enters the scintillator material, wherein the light emitting film is a strip film which has been separated from a transfer sheet and simultaneously adhered to an upper side of the rear member.

11. The radiation measuring device according to claim 10, wherein the transfer sheet is a thermal transfer sheet, and the light emitting film is formed by a thermal transfer method.

12. The radiation measuring device according to claim 10, wherein one or a plurality of films having a light shielding property are layered on a top side of the light emitting film by a thermal transfer method.

13. The radiation measuring device according to claim 10, wherein the light emitting layer includes an adhesive material to which the scintillator material for detecting α ray is added.

* * * * *